(12) United States Patent
Kincel et al.

(10) Patent No.: US 6,673,413 B1
(45) Date of Patent: Jan. 6, 2004

(54) COMPOSITE POLYMERIC TWIST TIE

(76) Inventors: Roger S. Kincel, deceased, late of Carlsbad, CA (US); by Katya M. Kincel, legal representative, 4928 Loma Laguna Dr., Carlsbad, CA (US) 92008; Luis C. Contreras, 1701 Steinbeck St., Placentia, CA (US) 92670

( * ) Notice: Subject to any disclaimer, the term of this patent is extended or adjusted under 35 U.S.C. 154(b) by 98 days.

(21) Appl. No.: 10/095,765

(22) Filed: Mar. 13, 2002

Related U.S. Application Data

(60) Division of application No. 09/583,021, filed on May 30, 2000, now Pat. No. 6,372,068, which is a continuation-in-part of application No. 09/400,254, filed on Sep. 21, 1999, now abandoned.

(51) Int. Cl.[7] .................................................. B32B 3/06

(52) U.S. Cl. ........................ 428/99; 428/172; 428/516; 24/30.5 W; 24/30.5 T; 385/136; 385/137; 385/83

(58) Field of Search ......................... 428/99, 167, 172, 428/516, 156, 192, 480; 24/30.5 R, 30.5 T; 383/61.2, 127; 206/49; 493/193; 385/83, 136, 137

*Primary Examiner*—Merrick Dixon
(74) *Attorney, Agent, or Firm*—Gordon K. Anderson

(57) ABSTRACT

A twist tie made of two dissimilar polymers forming a composite tying material that may be twisted upon itself forming a closure for a bag, container or bundle. A flat elongated ribbon like thermoplastic substrate (20) has a thermoplastic monofilament (28) disposed generally in the middle of one side and is bonded in place forming a homogeneous joint (40). Another configuration of the monofilament utilizes a pre-formed irregular shape singly or in opposed pairs. A second embodiment utilizes a ribbon of paper (26) laminated underneath the substrate.

20 Claims, 3 Drawing Sheets

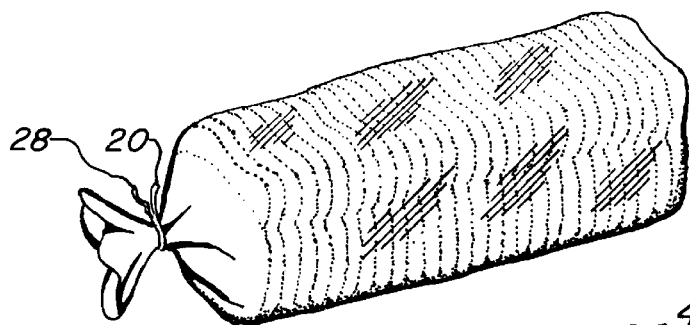
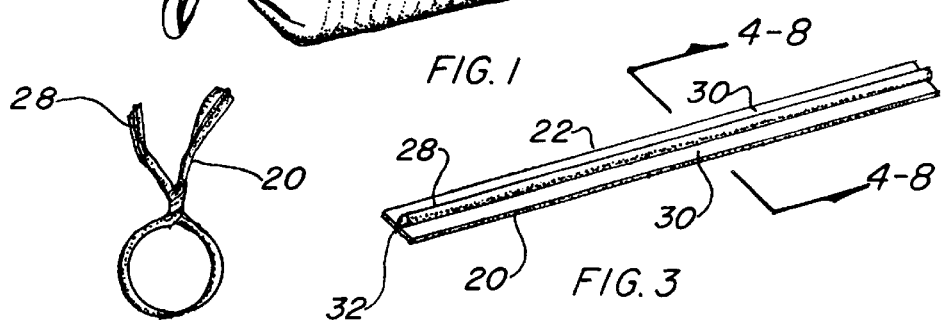
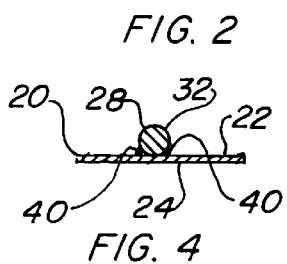 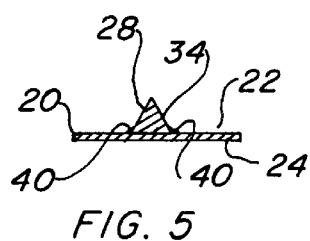 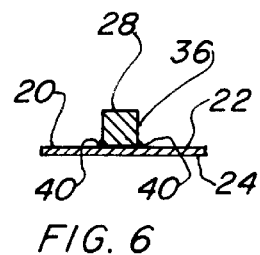
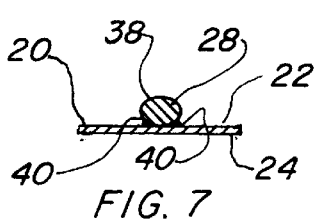 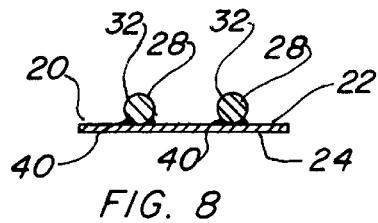
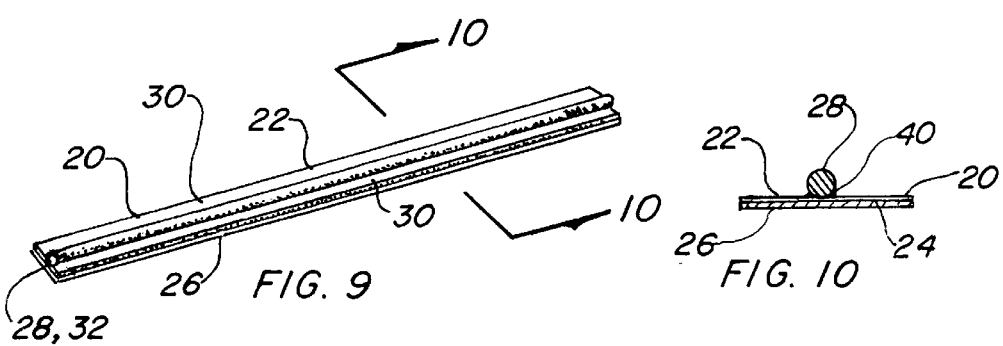

COMPOSITE POLYMERIC TWIST TIE

CROSS REFERENCE TO RELATED APPLICATION

This application is a continuation-in-part of application Ser. No. 09/400,254 filed Sep. 21, 1999, now abandoned and a divisional application of the pending continuation-in-part application Ser. No. 09/583,021 filed May 30, 2000 U.S. Pat. No. 6,372,068.

TECHNICAL FIELD

The present invention relates to twist ties in general. More specifically to a substantially polymeric tie that is comprised of a thermoplastic monofilament that is bonded to the center portion of a flat ribbon like thermoplastic substrate.

BACKGROUND ART

Previously, many types of twist ties have been used in endeavoring to provide an effective means for closing or tying articles such as bags, fastening plants to stakes, securing bundled electric cable and other restraining tasks. These ties have included strings, wires, adhesive tape, and ribbon sandwiched onto a metallic wire. The most common type of tie presently in use today is a pair of ribbons having a wire bonded in between with the ribbon fabricated of either plastic, paper or both. Attempts to eliminate the wire have resulted in unitary extrusions having a bulb-shaped central portion even to the extent that a core of rubber, or the like, is simultaneously extruded in the center. Other embodiments of tie material include foil strips or a number of strands of wire in parallel alignment, further attempts have been made to make the tie completely of thermoplastic material that acts like wire by orienting the plastic with heat and stretching also by adding fillers to the formulation to add stiffness and malleability.

A search of the prior art did not disclose any patents that read directly on the claims of the instant invention, however the following U.S. patents are considered related:

| Patent No. | Inventor | Issue Date |
| --- | --- | --- |
| 5,607,748 | Feltman | Mar. 4, 1997 |
| 5,342,687 | Iwai et al. | Aug. 30, 1994 |
| 5,154,964 | Iwai et al. | Oct. 13, 1992 |
| 4,797,313 | Stolk et al. | Jan. 10, 1989 |
| 4,391,063 | Gill,III | Jul. 5, 1983 |
| 3,409,948 | Goodwin | Nov. 12, 1968 |
| 2,108,741 | Betner | Feb. 15, 1938 |
| Foreign Patents: | | |
| GB2,060,469 | Ward et al. | May 7, 1981 (UK) |

Feltman in U.S. Pat. No. 5,607,748 teaches a wireless polymeric twist tie that includes a wing portion and one or more leaf portions. The twist tie is formed from an extruded non-metallic polymeric composition in a single indivisible form. The twist tie is fabricated of a material having both a tensile and yield strength of greater than 9,000 pounds per square inch.

U.S. Pat. No. 5,342,687 issued to Iwai et al. is for a non-metallic coreless twist tie formed by melting polymeric material, extruding the material in an elongated form, cooling then drawing the material at a rate of at least 2.5 times. The material may include 3 to 50 parts of glass beads and is formed from a resin having 10 to 60% crystallization at a temperature of 100 to 250 degrees centigrade.

U.S. Pat. No. 5,154,964 also of Iwai et al. discloses a similar twist tie, as above, with the glass beads added to the polymeric material having a particle size of less than 60 microns.

Stolk et al. in U.S. Pat. No. 4,797,313 teaches a non metallic polymeric ribbon deformed under tensile stress at 25 degrees centigrade and a strain rate between 0.1 and 0.5 inches per inch per minute. Optional materials are also employed in various polymers.

U.S. Pat. No. 4,391,063 issued to Gill, III discloses a sealing device for a balloon utilizing a thin strip of foil attached to a flexible retaining line. The strip is coated on one side with a pressure sensitive adhesive and folded to form the sealing device and also to attach to the line.

U.S. Pat. No. 3,409,948 issued to Goodwin is for a twist tie that employs a plastic ribbon bonded to a paper ribbon in a face-to-face relationship. The plastic ribbon includes a longitudinal channel and a metallic wire that is disposed within the channel between the ribbons and a cementitious coating is applied bonding the wire, paper and plastic ribbon together.

UK patent No. GB 2,060,469 issued to Ward is for the deformation of thermoplastic polymers by solid phase deformation and concomitant orientation of various polymers. The polymer may be filled with glass, asbestos, metal carbon, ceramic whiskers of silicon carbide or the like. The thermoplastic polymer is drawn through a die with tension insufficient to cause failure but progressively increasing the strain along with an elevated temperature of the die.

For background purposes and as indicative of the art to which the invention is related reference may be made to the remaining cited patents issued to Betner.

DISCLOSURE OF THE INVENTION

A primary object of the invention is to overcome the problems that are prevalent in today's industry using a metallic wire sandwiched between two ribbons. In the food industry where their use is widespread, typically bread bags, and other polyethylene bags for various edible products, the ties are mechanically attached and have die cut sharp ends that may inadvertently puncture the bag itself exposing the product to the atmosphere or even piercing the users fingers or hands.

It has been a common practice in the food industry to automatically inspect many packages for the presence of metal, such as sliced foods, as cutting blades may leave traces of metal within or near the product. It may be clearly seen that this automatic procedure makes the use of a wire embedded tie extremely objectionable at best and may even eliminate the possibility of its use entirely.

It is apparent that hazards exist particularly with young children that could accidentally ingest the tie which contains a metal in a pliable form and has very sharp ends that could ultimately lead to internal body damage.

Also since a conventional tie utilizes metal in its composition the original product package employing this type of tie may not be heated in a microwave oven as high frequency radiation arcs when metal is present thus necessitating additional and unnecessary handling and preparation of the packaged product by the user.

Another disadvantage to the use of metal in the tie material is that where the ends of the wire that have been cut off or the plating has been worn off by repeated twisting this surface may introduce undesired oxidization or rust in the presence of moisture.

A further disadvantage of the conventional configuration of the paper and wire tie is that over continued usage the paper covering the wire often twists off and falls away leaving the wire bare or partially stripped making it hard to handle and manipulate for further reuse.

There have been numerous attempts to produce a unitary non-metallic cordless thermoplastic twist tie that possesses the advantages of using a metal wire without all of the drawbacks, however, all of the known metal free ties have not as yet proven to be fully satisfactory and are not widely accepted in the industry at the present time.

An important object of the invention is to utilize a combination of thermoplastic materials with the core made of a substance that has the properties of metal wire, in that it is malleable and stays bent to a useable extent, and a ribbon that stretches out of the way without breaking and substantially reverts to its normal body shape when untwisted. This composite of dissimilar materials permits the core or filament to be twisted and retain this union with an attached substrate, forming the wings, expanding and following the filaments orientation without yielding.

Another object of the invention is that the twist tie is fabricated of two separate elements of dissimilar materials and processes bonded together permitting the best properties of each material or process to be selected without compromise. This composite of separate elements allows the ribbon to be chosen from a myriad of available sources using economies of number and a monofilament that is either presently obtainable or may be fabricated using a conventional yet customized procedure. The substrate or ribbon selected has the ability to spread the load around the bag or container to which it is closing and also to resist tearing when twisted. The monofilament replacing the wire has been selected for its dead fold properties and its ability to be easily twisted together and stay connected, also, its repeatability in this operation. Many plastic materials are rigid enough to be bent and retain a angular displacement, however, the thermoplastic must not be too stiff or brittle or it will not function properly as its ability to repeatedly duplicate twisting is of paramount importance. Both thermoplastic materials in use with this invention are compatible with each other permitting a homogeneous bonding together using conventional procedures.

Yet another object of the invention is the ease of manufacturer as the substrate may be purchased on the open market in the film configuration the proper width with no further modification necessary. The monofilament may also be purchased in a round rod form the proper diameter ready for orienting. Further the equipment necessary for orienting the monofilament, while special in some minor details, is readily available as well as the bonding apparatus all of which are well known in the art allowing the finished product to be competitively priced creating an advantage to the public.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment twisted onto the open end of a polyethylene plastic food storage bag.

FIG. 2 is a partial isometric view of the preferred embodiment of the twist tie formed into a loop and twisted together shown by itself without any bag closure.

FIG. 3 is a partial isometric view of the preferred embodiment with the tie illustrated in a flat position, cut to length.

FIG. 4 is a cross sectional view taken along lines 4—4 of FIG. 3 illustrating the preferred or round configuration of the monofilament bonded to the substrate.

FIG. 5 is a cross sectional view taken along lines 5—5 of FIG. 3 showing a triangular shaped configuration of the monofilament bonded to the substrate.

FIG. 6 is a cross sectional view taken along lines 6—6 of FIG. 3 depicting square shaped configuration of the monofilament bonded to the substrate.

FIG. 7 is a cross sectional view taken along lines 7—7 of FIG. 3 illustrating an oval shaped configuration of the monofilament bonded to the substrate.

FIG. 8 is a cross sectional view taken along lines 8—8 of FIG. 3 showing a pair of round monofilaments bonded to the substrate.

FIG. 9 is a partial isometric view of a second embodiment with the paper laminated underneath the substrate material.

FIG. 10 is a cross sectional view taken along lines 10—10 of FIG. 9.

BEST MODE FOR CARRYING OUT THE INVENTION

Figures 11, 12:
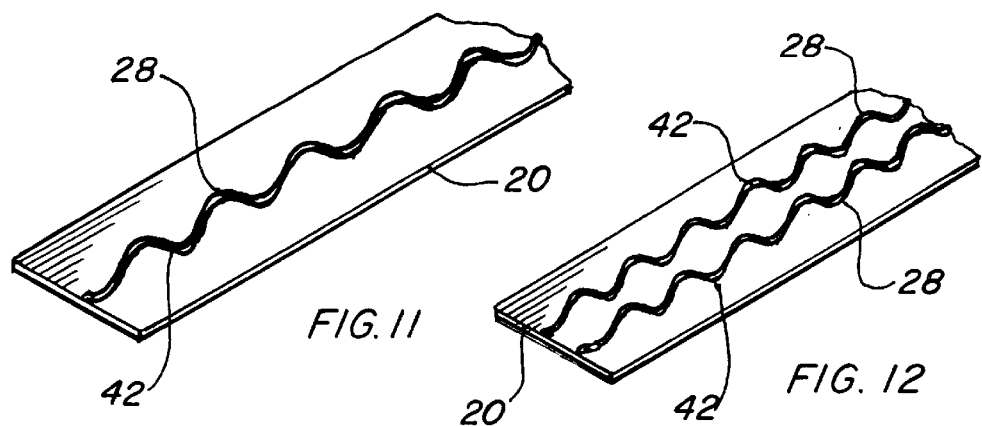
FIG. 11 is a partial isometric view of an embodiment with the monofilament disposed on top of the substrate material in a sinusoidal wave shape.
FIG. 12 is a partial isometric view of an embodiment with monofilaments disposed on top of the substrate material in a pair of duplicated opposed synchronized sinusoidal wave forms

The best mode for carrying out the invention is presented in terms of a preferred and a second embodiment. Both are basically alike except the second embodiment has paper laminated underneath the substrate. The preferred embodiment is shown in FIGS. 1 through 8 and is comprised of a substantially flat ribbon like thermoplastic substrate 20, as illustrated best in FIG. 3. The substrate 20 has a first side 22, a second side 24 and is initially manufactured in film form and slit to the desired width in a separate procedure. This process is well known in the art for existing paper or plastic and wire twist ties. The material for the substrate is thermoplastic in various forms each operable in the application but having its own limitations and characteristics. The size in thickness and width of the substrate 20 may vary considerably according to the application however there are preferred sizes in the industry in order to function properly in existing automatic tying machines both stationary and hand held.

The following polymers are acceptable for use in the invention:

Polyethylene formed from a polyolefin resin. This polymer is known for its toughness and utility useable from temperatures ranging from −70 to 200 degrees F. (−57 to 93 degrees C.) and also its superior chemical resistance. It has been found that the high density type is rigid and yet flexible enough to have the properties suitable for the application and as such is the preferred formulation.

Ethylene vinyl acetate (EVA) has been also found to function suitably as the ribbon like substrate. This copolymer approaches elastomeric materials in softness and flexibility therefore is also an ideal material for the flat elongated substrate 20.

Oriented polyethylene film available on today's market as a proprietary material is also a useable substance for the substrate 20 in that it is sufficiently flexible and will stretch to a limited extent while it is extremely malleable in its nature. While expensive to procure its useful characteristics overshadow this feature creating highly desirable results.

Polyethylene, laminated to a long fiber extensible paper 26 is well known in the art and has been used as the ribbon in a twist tie for decades. Prior art also uses a pair of ribbons glued or bonded together with a metallic wire imbedded in-between. The second embodiment of the invention is somewhat similar in that it employs the addition of paper material laminated under the thermoplastic substrate however in a completely different manner as shown in FIGS. 9 and 10. This embodiment utilizes the substrate 20 in the form of a thin film or ribbon of polyethylene laminated by any means known in the art such as coating, bonding, gluing, cementing or attaching in any fashion to a long fiber paper ribbon 26 on the second side 24. This arrangement is unique in its nature as it possesses all of the desirable features of the existing twist ties however it is basically different in its non-metallic structure.

In order to add body and stiffness to the tie and to permit a twist to be made and retain its joining effect, a thermoplastic monofilament 28 is contiguously disposed upon the first side 22 of the substrate 20 which in effect replaces the wire that has been used consistently in the existing art for decades. The monofilament 28 is positioned in the center of the substrate 20 which forms wings 30 on either side, preferably of equal proportions.

FIGS. 4–8 illustrate the position and configuration of the monofilament 28 which may vary in shape. FIG. 4, as an example, uses a round monofilament 32, FIG. 5 employs a triangular shaped monofilament 34, a square monofilament 36 is depicted in FIG. 6 and a oval shaped monofilament 38 is utilized in the invention as shown in FIG. 7. It may be easily seen that the shape of the monofilament 28 may take many forms and still function as intended. Other shapes and configurations may also fall within the scope of the invention. While a single monofilament 28 is described above, a plurality of monofilaments may also be utilized with equal ease. One or more monofilament 28 may be used on the first side 22 and one or more on the second side 24. Even two on a single side as illustrated in FIG. 8, may be employed since the utility dictates the amount of rigidity, strength and ease of handling required for a specific application.

The type of material used in forming the monofilament 28 is extremely important as the function of maintaining the twist and permitting re-twisting numerous times, particularly using only thermoplastic, is an essential part of the basis of novelty of the entire invention. It is worthwhile to place some empirical values on the ability of certain types of thermoplastic to maintain a bend by actually measuring the memory of the material. At the present time there is no industry standard that has been developed for this purpose, however, others in the art have utilized a rather simple test which is called a "dead fold test". This test exhibits the specimen materials memory when a sample is folded 180 degrees, approximately in half, with the remaining portions essentially parallel with each other. After relaxing for a period of at least three minutes at the prevailing ambient temperature, the angle of relaxation is obtained by measuring the included angle between the parallel portions. It is therefore expedient that the invention must employ, a monofilament material that has the characteristics that exhibit a so called dead fold angle of no greater than 10 degrees when folded in half, with the ends touching, and, when relaxed retaining this 10 degree angle for a minimum period of three minutes making it entirely acceptable for this application.

Oriented polyethylene processed by stretching the material through a heated die is an ideal material and is capable of passing the dead fold test in excess of ten times which is more than expected in normal usage and is capable of being re-tied the same number of times in a typical bag enclosure configuration.

Acrylonitrile butadiene styrene (ABS) resin is also an acceptable candidate for the material of the monofilament 28, as it likewise is capable of meeting or exceeding the requirements of the above described tests. ABS plastic further has the attributes of being nontoxic, odorless having a good balance of tensile strength, rigidity and toughness also it possesses both the qualities of being heat and chemical resistant.

It will be noted that while all of the materials described above may be generically the same, is has been found that in order to maximize the desirable properties of each material in the composite twist tie the substrate 20 and the monofilament 28 are dissimilar in either basic thermoplastic substance, formulation or morphology. The reason for this dissimilarity is that the industry has tried in vane for years to develop a simple one piece tie using the same material but the compromise of characteristics has proven to be too great to be successful.

Figures 13, 14:
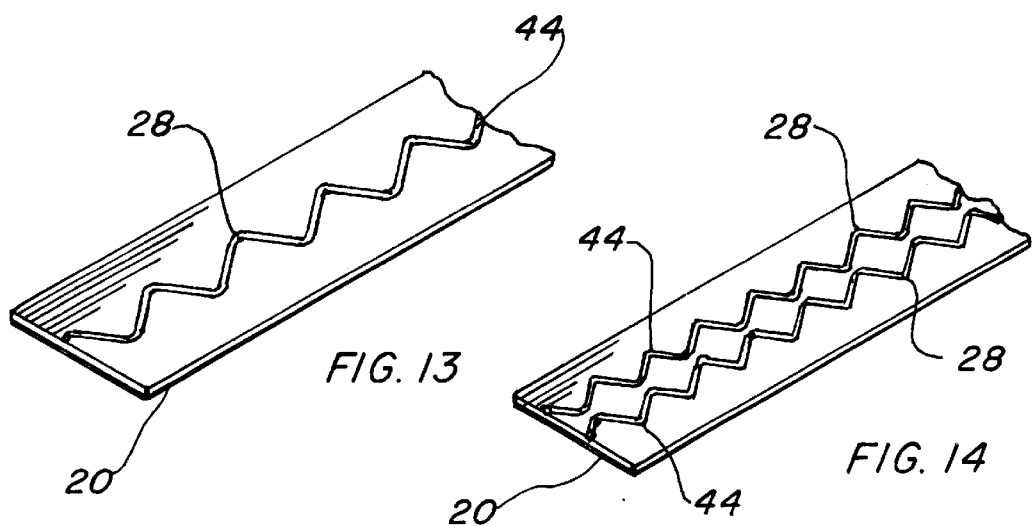
FIG. 13 is a partial isometric view of an embodiment with the monofilament disposed on top of the substrate material in a reoccurring angle wave form.
FIG. 14 is a partial isometric view of an embodiment with the monofilaments disposed on top of the substrate material in a pair of opposed duplicated reoccurring angle wave forms with the apex of the angles in alignment.
Figures 15, 16:
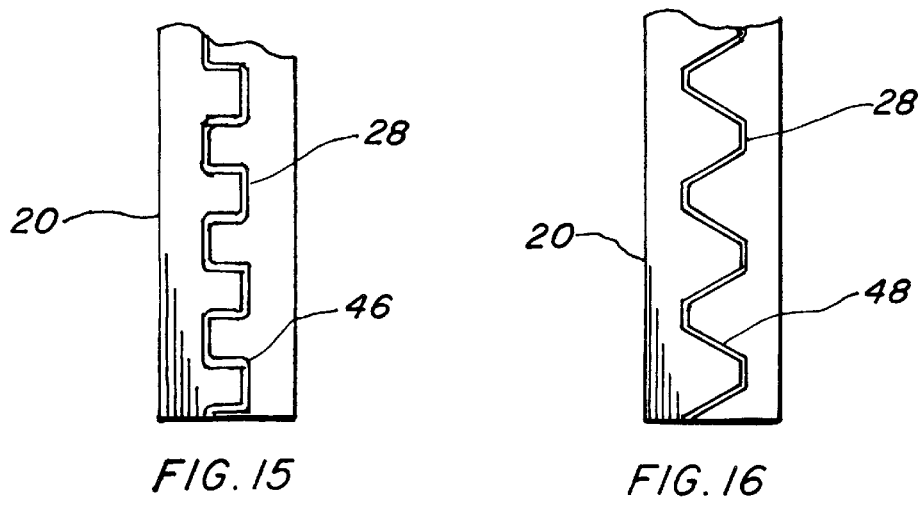
FIG. 15 is a partial isometric view of an embodiment with the monofilament disposed on top of the substrate material in a single square wave shape.
FIG. 16 is a partial isometric view of an embodiment with the monofilament disposed on top of the substrate material in a truncated triangular form.

While the monofilament 28 is illustrated in FIG. 3 as being straight when it is disposed on top of the substrate 20 it has been found that other configurations and combinations of shape are even more prone to retain their twist and actually wrap around each end easier and because of their original shape allows them to intertwine. FIGS. 11–16 illustrate this configuration of the monofilament 28 with FIG. 11 depicting a sinusoidal wave shape 42 and FIG. 12 the sane shape only duplicated using a pair of opposed synchronized wave forms. FIG. 13 shows the monofilament 28 in a reoccurring angle form 44 and FIG. 14 in opposed duplicate of shape with the apex of the angles in alignment. It should be noted that the angles may preferably be from 170 to 30 degrees or actually any angle and still function properly also they may be separated a considerable distance or even be contiguous with one another. FIG. 15 illustrates a single square wave 46 and FIG. 16 a truncated triangular form 48 and duplicate pairs may also be utilized with equal ease. Only a few of the possible shapes are illustrated and described however this is not meant to limit the configurations of the monofilament as the inventors anticipate that other shapes will also function properly.

Bonding means joining the monofilament 28 to the substrate 20 is in the form of joint 40 created by using either ultrasonic welding, a melt bond or cementing with adhesive.

Ultrasonic welding utilizes electrical energy at a minimum frequency of approximately 20,000 Hertz which converts electrical energy to mechanical energy at the same frequency. A resonant section, or so called horn, transmits the mechanical vibrations into the workpiece. Vibrations travel through the material to the boundary between the substrate 20 and the monofilament 28 causing frictional heat thus melting the two dissimilar materials into a homogeneous joint 40.

Bonding by the melt method is attained by pressing the monofilament 28 into the substrate 20 that has been positioned on a heated metal surface causing the two materials to be simultaneously melted with the pressure maintained until the joint 40 is cured.

Cementing with adhesive is accomplished using solvent, dope or chemical cements. Solvent causes the surfaces of the joined material to go into solution with the remaining solvent flashing off leaving a permanent bond. Dope cements contain a quantity of thermoplastic material compatible with both formulations being bonded plus a solvent, as above, functioning in the same manner. Chemical cements are synthetic resins which polymerize in the joint 40 forming the bond. It will be clearly seen that all of the above approaches to bonding are viable, and yet other methods and materials are not to be eliminated.

The twist tie may be formed in sheets and partially slit or have perforations for manually separating such as used for trash bags or it may be manufactured in ribbon form and stored on reels such as those well known in the art. The industry uses a wide variety of manufacturing processes including handling and storage methods and any and all may be incorporated in the fabrication of the invention.

Figure 17:
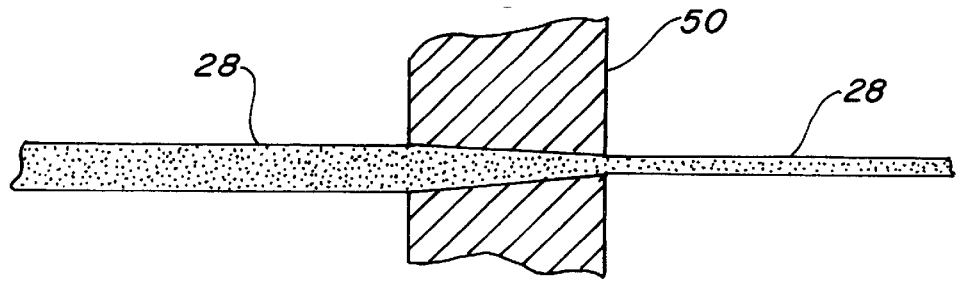
FIG. 17 is an arbitrary cross sectional of the process apparatus for orienting the monofilament from its original diameter to its final form.

The process of forming the composite polymeric twist tie, as an example, using the combination of polyethylene material and ultrasonic welding is accomplished by first orienting the monofilament 28 to improve its dead fold properties and ability to be easily twisted together and stay connected, also, its repeatability. It has been found that a round rod of high density polyethylene is ideal for the base of this element either in its commercially available formulation or by the addition of from 3.5 to 10% talc, by weight to assist in the drawing and to eliminate adhering together when stored in a roll. In either event this material, is best suited in the form of a substantially round, high density polyethylene rod having a diameter of from 0.110 inch (0.279 cm) to 0.075 inch (0.191 cm). The base material is drawn through a heated tapered die 50 as illustrated in FIG. 17 into a diameter from 0.025 inch (0.064 cm) to 0.035 inch (0.089 cm). The heated tapered die 50 functions best at a temperature below the melting point of the high density polyethylene with at least 265 degrees F. (129.5 degrees C.) being ideal. The polyethylene monofilament 28 in the rod form is preheated to at least 250 degrees F. (121.1 degrees C.) prior to drawing through this heated tapered die 50. The material is drawn through the die 50 with only sufficient pressure to maintain the requisite diameter without a further reduction in size.

Figure 18:
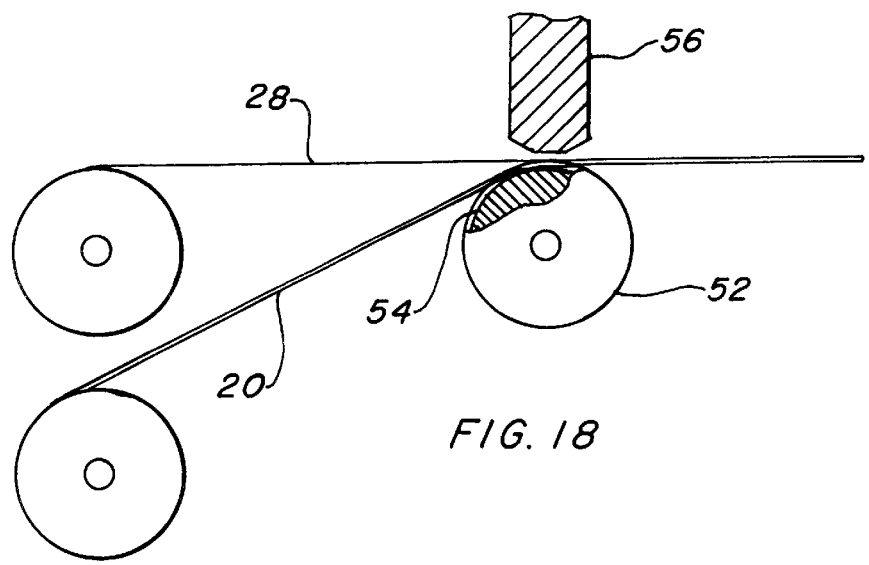
FIG. 18 is an arbitrary cross sectional of the process apparatus for bonding the monofilament to the substrate with an ultrasonic weld.
Figures 19, 20:
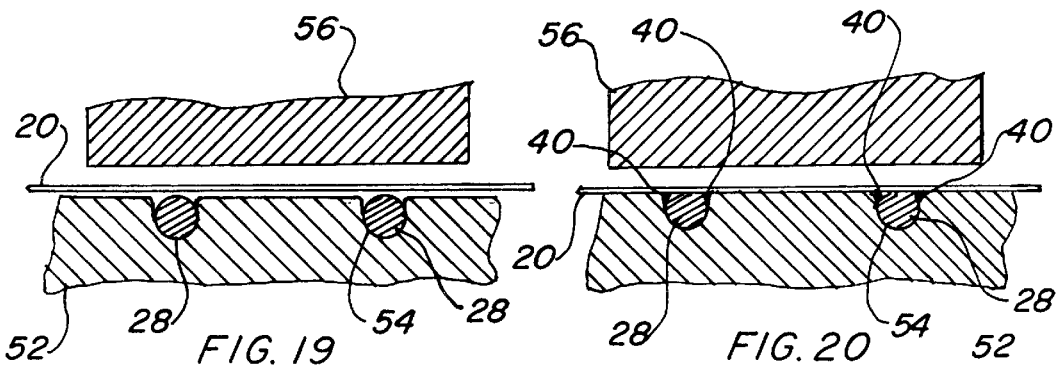
FIG. 19 is an arbitrary cross sectional of the process apparatus showing the grooves in the roller for bonding the monofilament to the substrate using an ultrasonic horn prior to welding.
FIG. 20 is an arbitrary cross sectional of the process apparatus showing the grooves in the roller for bonding the monofilament to the substrate using an ultrasonic horn after welding has been completed.
Figure 21:
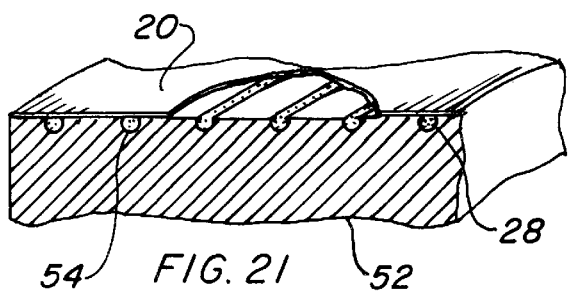
FIG. 21 is a fragmentary partial isometric view of the process apparatus showing a plurality of grooves in the roller for bonding the monofilament to the substrate using ultrasonic welding.

FIGS. 18 through 22, illustrate the next step using a grooved roller 52 that contains a number of individual grooves 54 just slightly larger in radius than the monofilament 28, and is supplemented by additional apparatus to guide at least one thermoplastic monofilament 28 into each mating groove 54 in the roller 52. Further the twist tie is formed by simultaneously guiding a flat elongated ribbon like thermoplastic substrate 20 on top of the monofilament 28 as shown in FIG. 18. It should be noted that the substrate 20 is dissimilar in basic morphology with the monofilament 28 in order to provide the optimum properties of the twist tie as the substrate must be pliable and the monofilament suitable for holding a bend. The preferred flat elongated ribbon like thermoplastic substrate 20 in this combination is an polyethylene film having a thickness of from 0.0025 inch (0.0635 cm) to 0.006 inch (0.0152 cm). This film may be either the low density or high density type however it is not necessarily oriented as its properties are best suited when it is in the more pliable state.

Figure 22:
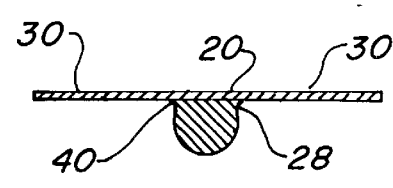
FIG. 22 is an arbitrary cross sectional view illustrating the preferred or round configuration of the monofilament bonded to the substrate using ultrasonic welding.

The next step in the process is bonding the monofilament 28 to the substrate 20 with an ultrasonic weld forming a composite twist tie such that the tie may be twisted upon itself with the monofilament retaining its original configuration and the substrate stretching and bending to conform within a coupled twist. Welding using ultrasonic methods has been discussed previously and is well known in the art. The horn 56 of the ultrasonic welder is depicted in FIG. 18 thorough 20 which is located directly above the roller 52 with the correct gap and power intensity precisely adjusted to provide a melted joint without destroying the integrity of the relatively thin substrate 20. FIG. 22 illustrates this weld which includes a slight radius between the elements which is forged from the parent material of both the substrate 20 and the monofilament 28 when they are fused together.

The final step in this process of forming a composite polymeric twist tie on a grooved roller is to slit the substrate 20, with the monofilament 28 attached, into individual strips substantially 0.156 inch (0.396 cm) wide each having at least one monofilament welded thereunto as more than one may be used as depicted in FIGS. 8, 12 and 14. When the tie is slit the individual strip is rolled onto a spool ready for use.

It should be realized that the above description of the process is for specific materials with their appropriate parameters however other materials may be used with equal ease such as ethylene vinyl acetate or polyethylene coated paper etc. for the substrate 20 and acrylonitrile butadiene styrene etc. for the monofilament 28. If the monofilament has an irregular pattern the groove 54 in the roller 52 is simply wider or it may actually have the same configuration as the material and multiples of the monofialment are treated in the same manner. Where the bonding means are not ultrasonically welded the other methods outlined above may be easily substituted to accomplish the same end result using similar tooling and procedures.

While the invention has been described in complete detail and pictorially shown in the accompanying drawings, it is not to be limited to such details, since many changes and modifications may be made in the invention without departing from the spirit and scope thereof. Hence, it is described to cover any and all modifications and forms which may come within the language and scope of the appended claims.

What is claimed is:

1. A composite polymeric twist tie comprising;
   a substantially flat elongated ribbon like thermoplastic substrate having a first side and a second side,
   at least one thermoplastic monofilament contiguously disposed upon said substrate on the first side forming wings on either side of the monofilament, and
   bonding means joining said monofilament to said substrate into a composite twist tie such that the tie may be twisted upon itself with the monofilament retaining its basic configuration and the wings stretching and bending to conform within a coupled twist.

2. The composite polymeric twist tie as recited in claim 1 wherein said substrate and said monofilament are dissimilar in basic thermoplastic substance and formulation.

3. The composite polymeric twist tie as recited in claim 1 wherein said substrate and said monofilament are dissimilar in basic thermoplastic morphology.

4. The composite polymeric twist tie as recited in claim 1 wherein said flat elongated ribbon like thermoplastic substrate is polyethylene formed from a polyolefin resin.

5. The composite polymeric twist tie as recited in claim 4 wherein polyethylene is the high-density formulation.

6. The composite polymeric twist tie as recited in claim 1 wherein said flat elongated ribbon like thermoplastic substrate is ethylene vinyl acetate (EVA) formed from a vinyl polymer.

7. The composite polymeric twist tie as recited in claim 1 wherein said flat elongated ribbon like thermoplastic substrate is orientated polyethylene film.

8. The composite polymeric twist tie as recited in claim 1 wherein said flat elongated ribbon like thermoplastic substrate is polyethylene laminated to a long fiber paper.

9. The composite polymeric twist tie as recited in claim 1 wherein said thermoplastic monofilament further exhibits a dead fold angle no greater than 10 degrees when said monofilament is folded in half with the ends touching, and, when relaxed retaining at least this 10 degree angle for a minimum period of three minutes.

10. The composite polymeric twist tie as recited in claim 1 wherein said thermoplastic monofilament is oriented polyethylene.

11. The composite polymeric twist tie as recited in claim 1 wherein said thermoplastic monofilament is oriented polyethylene using a heated die during a stretching process.

12. The composite polymeric twist tie as recited in claim 1 wherein said thermoplastic monofilament is acrylonitrile butadiene styrene (ABS) resin.

13. The composite polymeric twist tie as recited in claim 1 wherein at least one thermoplastic monofilament is disposed upon said substrate in an irregular pattern.

14. The composite polymeric twist tie as recited in claim 13 wherein said thermoplastic monofilament disposed upon said substrate in an irregular pattern further comprising a pair of opposed synchronized wave forms.

15. The composite polymeric twist tie as recited in claim 1 wherein said bonding means further comprise a ultrasonic weld utilizing electrical energy at a frequency of substantially 20,000 Hertz.

16. The composite polymeric twist tie as recited in claim 1 wherein said bonding means further comprise a melt bond joining the monofilament to the substrate using heat, melting the two thermoplastics elements and maintaining contact until cooled.

17. The composite polymeric twist tie as recited in claim 1 wherein said bonding means further comprise cementing the monofilament to the substrate with adhesive, said adhesive containing a solvent and similar plastic producing a homogeneous joint when cured.

18. A composite polymeric twist tie comprising;
    a substantially flat elongated ribbon like thermoplastic substrate having a first side and a second side,
    at least one dissimilar thermoplastic monofilament having dead fold properties contiguously disposed upon said substrate on the first side forming wings on either side of the monofilament, and
    bonding means joining said monofilament to said substrate into a composite twist tie such that the tie may be twisted upon itself with the monofilament retaining its original configuration and the wings stretching and bending to conform within a coupled twist.

19. The composite polymeric twist tie as recited in claim 18 wherein said dead fold properties exhibit a dead fold angle of less than 10 degrees when said monofilament is folded in half with the ends touching, and, when relaxed retaining at least this 10 degree angle for a minimum period of three minutes.

20. A composite polymeric twist tie comprising;
    a substantially flat elongated ribbon like thermoplastic substrate, at least one thermoplastic monofilament contiguously disposed upon said substrate, and bonding means joining said monofilament to said substrate into a composite twist tie such that the tie may be twisted upon itself with the monofilament retaining its original configuration and the ribbon stretching and bending to conform within a coupled twist.

* * * * *